United States Patent [19]

Tehan

[11] Patent Number: 5,567,159
[45] Date of Patent: Oct. 22, 1996

[54] METHOD AND APPARATUS FOR TEACHING READING

[76] Inventor: Margaret A. Tehan, 119 Marlboro Pl., Dayton, Ohio 45420

[21] Appl. No.: 383,593

[22] Filed: Feb. 3, 1995

[51] Int. Cl.$^6$ ................................................. G09B 17/00
[52] U.S. Cl. .......................... 434/178; 434/159; 434/170; 434/167; 434/403
[58] Field of Search .................................. 434/159, 160, 434/167, 170, 171, 172, 178, 156, 403, 195, 196, 207, 208, 162, 165, 112, 113, 222, 223; 273/272, 299

[56] References Cited

U.S. PATENT DOCUMENTS

| | | |
|---|---|---|
| 1,472,536 | 10/1923 | Thomson . |
| 3,612,536 | 10/1971 | Saul ..................................... 434/172 X |
| 4,439,160 | 3/1984 | Krempel ................................. 434/170 |
| 5,328,373 | 7/1994 | Wood ..................................... 434/172 |

FOREIGN PATENT DOCUMENTS

2195487  4/1988  United Kingdom ................... 434/178

*Primary Examiner*—Gene Mancene
*Assistant Examiner*—Jeffrey A. Smith
*Attorney, Agent, or Firm*—Biebel & French

[57] ABSTRACT

A method and apparatus for teaching reading and spelling skills to children which is particularly adapted to be used in teaching children with a short-term memory disability. Visual indicator members are provided wherein a first set of visual indicator members represent vowel letters, a second set of visual indicator members represent consonant letters extending above a middle line on a ruled penmanship paper, a third set of visual indicator members represent consonant letters extending below a lower line on a ruled penmanship paper and a fourth set of visual indicator members represent consonant letters not represented by the second and third sets of visual indicator members. Each of the visual indicator members of each set have a unique color characteristic whereby the members of each set are distinguishable from each other. In addition, the members of each set have a common physical characteristic, such as height, whereby the different sets may be distinguished from each other. The visual indicator members may be selectively placed together to form different words whereby a child may learn to read without first memorizing the alphabet.

12 Claims, 8 Drawing Sheets

METHOD AND APPARATUS FOR TEACHING READING

BACKGROUND OF THE INVENTION

The present invention relates to an aid for teaching children to develop language skills and, more particularly, to a visual manipulative aid to be used in developing a child's reading and spelling skills.

In order to teach a child to read the English language, the child must learn to distinguish between the 26 different symbols comprising the standard English alphabet, and further must learn the sounds associated with each letter or combination of letters of the alphabet.

For children with short term memory problems, decoding, or the recognition of letters and the sounds they represent, can often be a difficult skill to develop. For such children, learning reading skills can become an overwhelming task due to the numerous symbols or letters which must be learned in order to practice reading skills.

By way of comparison, children are typically able to practice mathematical skills earlier than reading skills. This may be explained by noting that mathematics requires children to learn only 10 symbols, i.e., 0–9, in order to practice and learn math skills. Although a child must learn various combinations of the symbols, 0–9, the number of factors, or variations, that must be learned are significantly lower than the number of factors involved in learning to use the 26 symbols of the alphabet. Thus, as a result of being able to cope with the ten numeric symbols involved in mathematics, the child is able to practice the simple concepts involved in mathematics, such as addition and subtraction, relatively early. However, the overwhelming number of symbols required for learning reading skills becomes a roadblock to the child developing reading skills. This is particularly true for children with short-term memory disabilities for whom memorization of arbitrary symbols is particularly difficult.

In addition, when a child is not able to learn all of the 26 letters of the alphabet, he or she may develop the bad habit of guessing the sound of a word without regard to all of the letters in the word. For example, the child may recognize the sound of the first letter in the word and try to guess the ending of the word without regard to the letters forming the ending.

What is needed therefore is a system for teaching reading wherein the number of factors, or variables, which must be learned and understood are kept to a minimum. Further, there is a need for such a system wherein basic skills already developed by the child for recognizing differences among objects is used, and which permits the child to learn to carefully observe patterns within words without requiring the initial learning of the symbols used for the alphabet.

SUMMARY OF THE INVENTION

The present invention provides a method and apparatus for teaching reading skills to children, and which is particularly adapted to be used in teaching children with learning disabilities, such as children with short term memory problems.

In particular, the present method and apparatus comprises a system which provides a visual and tactile experience for learning the abstract concept of letters and letter patterns. The system uses visual indicator members in the form of colored cubes to represent the individual letters of the alphabet. The visual indicator members are organized into sets which facilitate the correlation in the child's mind between the visual indicator members and the actual letters that they represent.

Each set has a physical characteristic which enables the child to distinguish it from the other sets. For example, each set may have a distinctive combination of cubes and/or orientation of cubes to distinguish it from the other sets. Further, the visual indicator members forming each set are distinguishable from each other by means of a visual indicia on the members, such as by means of a distinctive color characteristic for each indicator member within a set.

Since learning differences between sizes and colors is an early learned skill, which is also typically easily grasped by children with learning disabilities, the present system utilizes skills already acquired by the child in order to develop reading skills. In addition, the present system presents the visual indicator members to the child in such a manner as to facilitate the association of the visual indicator member with the particular letter that it represents.

In a preferred form of the present invention, an apparatus is provided for teaching reading skills including a plurality of colored visual indicator members. The visual indicator members are grouped into distinct sets to represent predetermined groups of letters. Each set comprises a plurality of the visual indicator members wherein each visual indicator member of each set has a different color appearance than the other visual indicator members in that set. Thus, different letters within a set may be identified with reference solely to the color appearance of the visual indicator members within each set.

Further, the visual indicator members for each set have a common physical characteristic whereby the sets are distinguishable from each other. The distinguishing physical characteristic is preferably a common height dimension for all of the members of each particular set.

In a method for teaching reading skills in accordance with the present invention, a plurality of colored visual indicator members are provided representing letters. The visual indicator members are grouped into sets according to the physical characteristics of the letters of the alphabet that the visual indicator members are intended to represent. Each visual indicator member of each set also includes a unique color characteristic for distinguishing it from other visual indicator members of the same set. The method includes the steps of selecting visual indicator members from the sets and arranging the selected visual indicator members to form a word sound, and identifying the word sound formed by the individual indicator members.

In the method for teaching reading skills, selected visual indicator members may represent either the beginning or ending portions of a word and additional visual indicator members may be placed in association with these portions of words to make complete words.

Therefore, it is an object of the present invention to provide an apparatus for facilitating teaching of reading and spelling skills to children having short-term memory problems.

It is a further object of the invention to provide such a method and apparatus for teaching reading and spelling skills wherein basic concepts learned by a child during their early formative years are utilized.

Other objects and advantages of the invention will be apparent from the following description, the accompanying drawings and the appended claims.

DETAILED DESCRIPTION OF THE PREFERRED EMBODIMENT

The present invention provides a method and apparatus forming a system for facilitating teaching of reading and spelling skills. This system is particularly adapted to be used with children having a short-term memory disability, but may be used equally well with other children. The present system builds on the skills already acquired by children in their early formative years, and particularly uses the child's ability to distinguish between objects having generally different sizes and/or shapes, and the ability to distinguish between objects having different color characteristics.

In the preferred embodiment of the present invention, manipulative or interlocking counting cubes or blocks are used to represent letters of the alphabet. An example of such cubes are cubes sold under the trademark Unifix by Didax of Rowley, Mass. These blocks are provided in different colors and are typically used for teaching counting or math skills to children.

Figure 1:
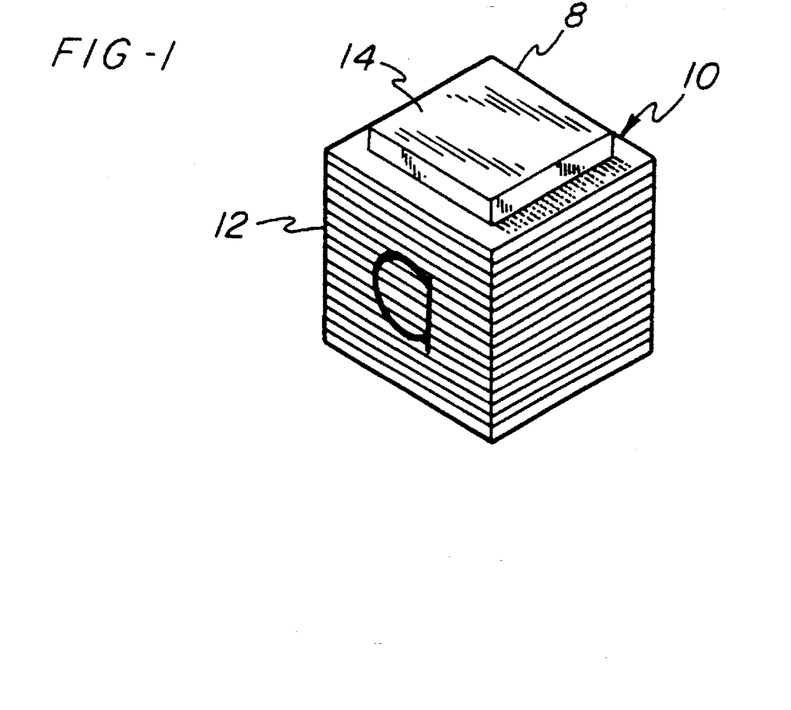
FIG. 1 is a top side perspective view of a visual indicator member used in the present invention.
Figure 2:
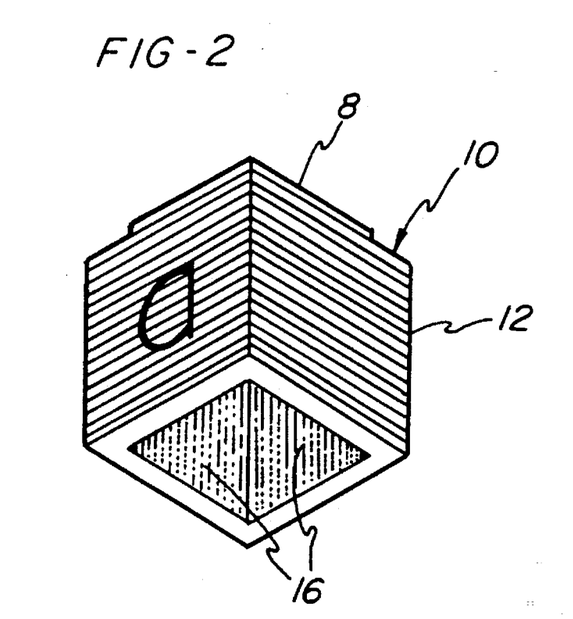
FIG. 2 is a bottom side perspective view of a visual indicator member used in the present invention.

Referring to FIGS. 1 and 2, a typical block 8 forming a visual indicator member 10 representing the letter a is illustrated. Each block includes a base portion 12 forming a hollow cube, and an interlocking protrusion 14 located on an upper end of the base 12. The interlocking protrusion 14 is adapted to frictionally engage the inner walls 16 of the base 12 whereby each of the blocks may be interlockingly attached to other blocks. It should be noted that although the block 8 illustrated in FIGS. 1 and 2 is shown with the letter a on the block 8, the present system is specifically designed to be used without conventional letter symbols being directly associated with the blocks, as illustrated by the blocks shown in FIGS. 3–9. Further, it should be noted that the patterns illustrated on the blocks are linings which are representative of particular colors for the blocks.

Referring to FIGS. 3–6, the present system divides the letters of the alphabet into four distinct groups or sets wherein each set includes a plurality of visual indicator members, one visual indicator member for each letter of the set. Further, all of the visual indicator members for each set have a common physical characteristic whereby the sets may be distinguished from each other. In the preferred embodiment, the physical characteristic comprises a dimensional characteristic in the form of the height and/or orientation of the visual indicator members for the set.

The physical characteristic selected for each set of visual indicator members is intended to correspond as closely as possible to the physical characteristics of lower case letters of the alphabet which the visual indicator members are intended to represent. It should be noted that throughout the figures the lower case letter corresponding to a particular visual indicator member is shown below the visual indicator member written on penmanship lines typically found on penmanship paper for students, and including an upper solid line 18, a lower solid line 20, and a middle dotted line 22.

Figure 3:
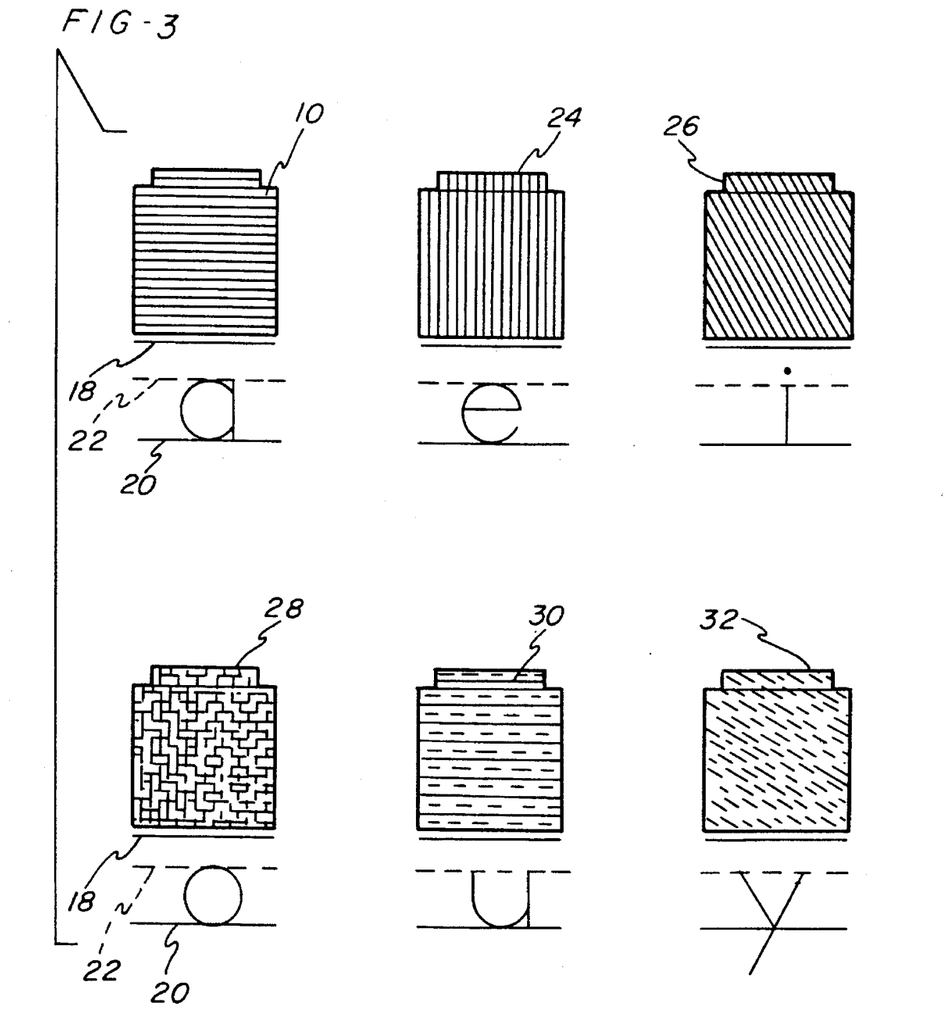
FIG. 3 is an elevational view of a first set of visual indicator members for use in the present invention.

FIG. 3 illustrates a first of the visual indicator members representing the vowel letters a, e, i, o, u, and y. Each of the visual indicator members has a different color characteristic whereby the members of the set may be distinguished from each other. In particular, the visual indicator member 10, representing the letter a, is blue; the visual indicator member 24, representing the letter e, is red; the visual indicator member 26, representing the letter i, is green; the visual indicator member 28, representing the letter o, is yellow; the visual indicator member 30, representing the letter u, is light blue; and the visual indicator member 32, representing the letter y, is orange. The visual indicator members for the first set illustrated in FIG. 3 are all formed using one cube to thereby represent the typical physical characteristic of the lower case vowels, which are short and usually formed between the lower line 20 and middle line 22.

Figure 4:
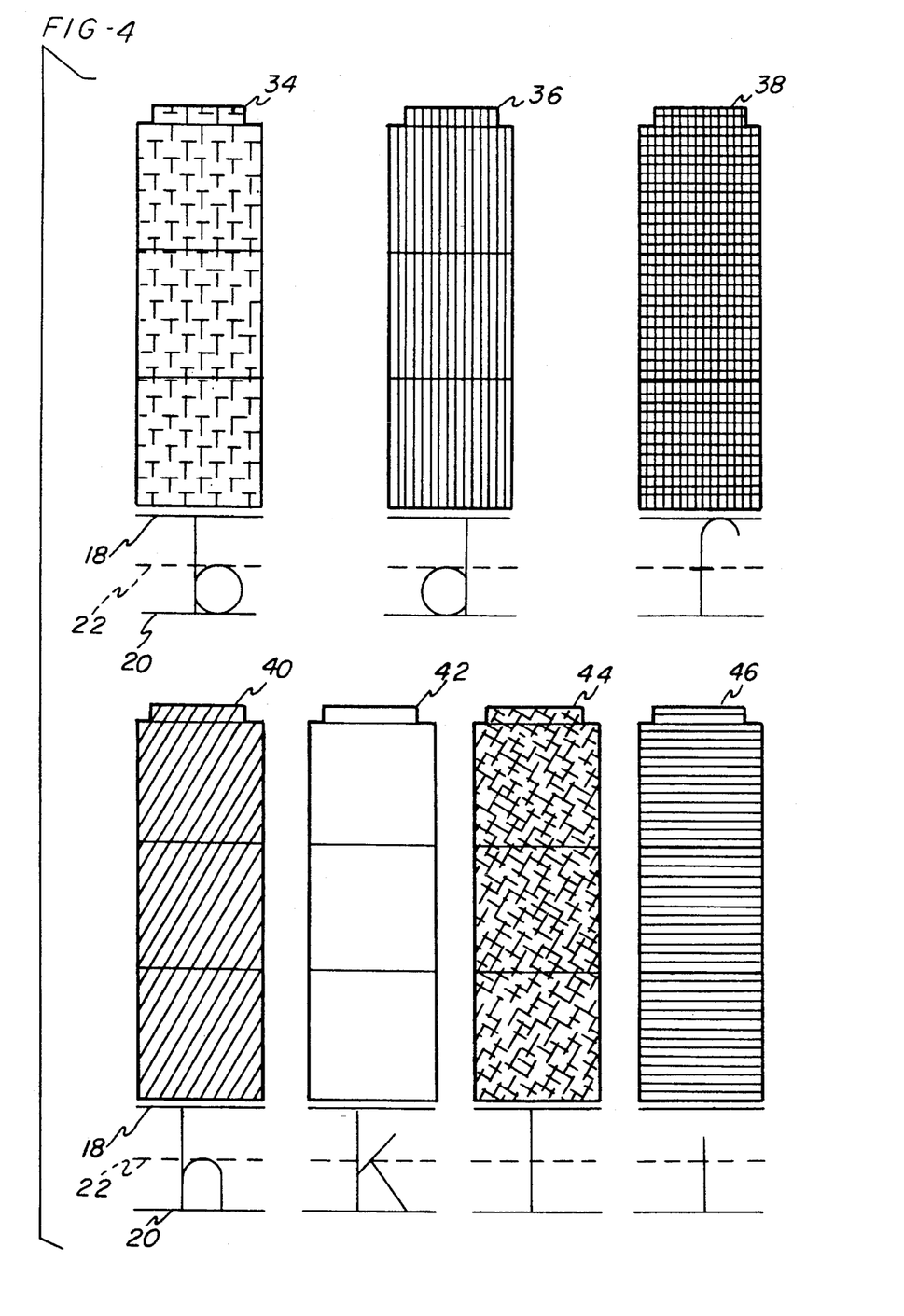
FIG. 4 is an elevational view of a second set of visual indicator members used in the present invention.

FIG. 4 illustrates a second set of visual indicator members representing consonant letters extending above the middle line 22, which letters are referred to as tall letters. Each of the letters in the second set of FIG. 4 are represented by a different color characteristic. In particular, visual indicator member 34, representing the letter b, is yellow; visual indicator member 36, representing the letter d, is red; visual indicator member 38, representing the letter f, is black; visual indicator member 40, representing the letter h, is brown; visual indicator member 42, representing the letter k, is white; visual indicator member 44, representing the letter 1, is orange; and visual indicator member 46, representing the letter t, is blue. It should be noted that the visual indicator members of the second set are each formed by connecting three blocks together, such that the visual indicator members are three times taller than the visual indicator members of the first set, and thus correspond to the tall height characteristic of the letters they represent.

Figure 5:
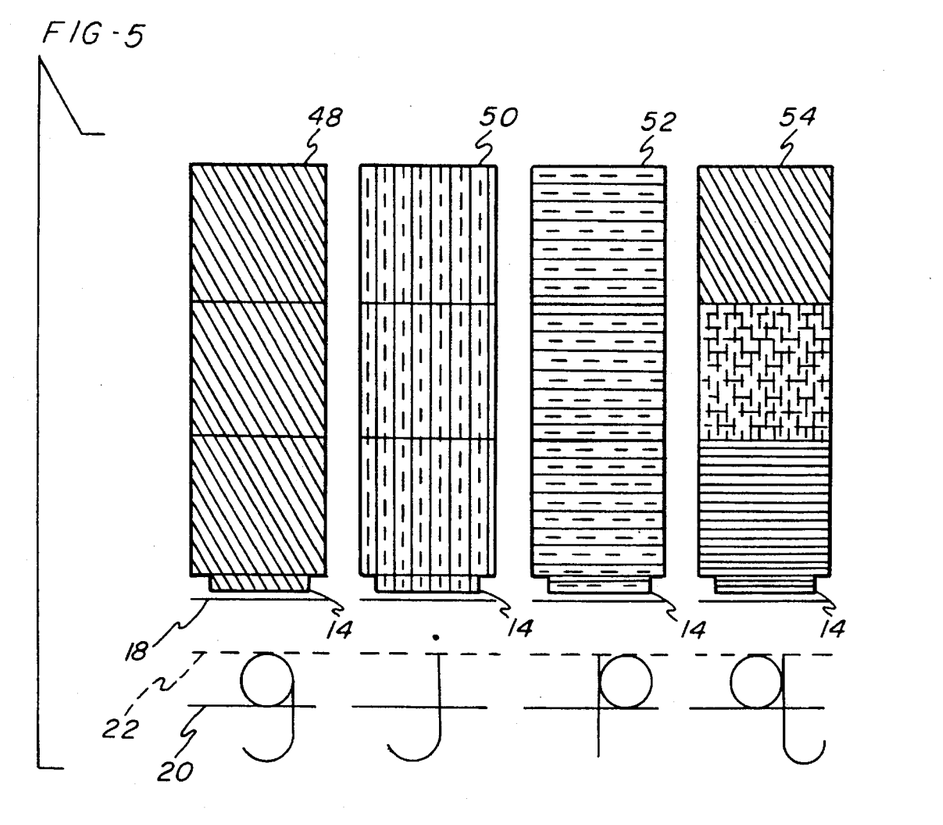
FIG. 5 is an elevational view of a third set of visual indicator members used in the present invention.

FIG. 5 illustrates a third set of visual indicator members representing the consonant letters g, j, p, and q. These letters are referred to in the present systems as tail letters extending below the lower line 20 of the ruled penmanship lines. As in the second set of visual indicator members, the third set of visual indicator members are each formed with three interconnected blocks. However, this set is distinguished from the previous set in that the orientation of the blocks is reversed such that the interlocking protrusion 14 of the third set extends downwardly whereas the interlocking protrusion of the second set extends upwardly. The visual indicator members of the third set each have a distinguishing color characteristic wherein the visual indicator member 48, representing the letter g, is green; the visual indicator member 50, representing the letter j, is pink; the visual indicator member 52, representing the letter p, is light blue; and the visual indicator member 54, representing the letter q, has a green top, a yellow middle and a blue bottom. The visual indicator member 54 representing the letter q illustrates how the blocks or cubes used in the present system may be used to facilitate reinforcing the letters in a child's mind in that the different colors of the visual indicator member 54 may remind a child of a patchwork quilt having different colors.

Figure 6:
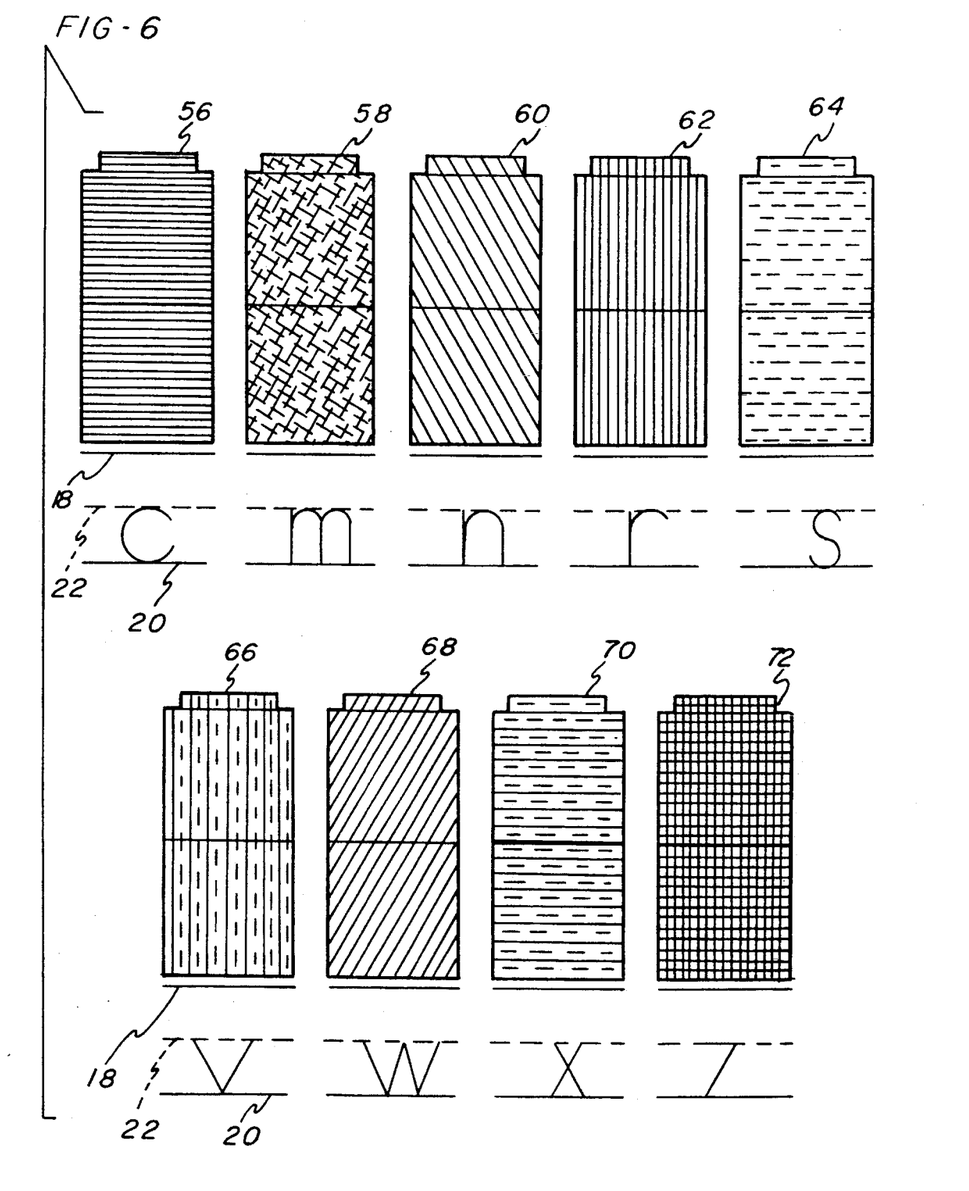
FIG. 6 is an elevational view of a fourth set of visual indicator members used in the present invention.

FIG. 6 illustrates a fourth set of visual indicator members representing consonant letters not represented by the second and third sets, and including the letters c, m, n, r, s, v, w, x, and z. These visual indicator members are referred to in the present system as half letters. The visual indicator members of the fourth set are each formed by two interconnected cubes whereby they correspond in physical dimension to the consonants that they represent having a smaller height than the consonants of the second and third sets. The visual indicator members of the fourth set each have a distinguishing color characteristic wherein the visual indicator member 56, representing the letter c, is blue; the visual indicator member 58, representing the letter m, is orange; the visual indicator member 60, representing the letter n, is green; the visual indicator member 62, representing the letter r, is red; the visual indicator member 64, representing the letter s, is yellow; the visual indicator member 66, representing the letter v, is pink; the visual indicator member 68, representing the letter w, is brown; the visual indicator member 70, representing the letter x, is light blue; and the visual indicator member 72, representing the letter z, is black.

Figure 7:
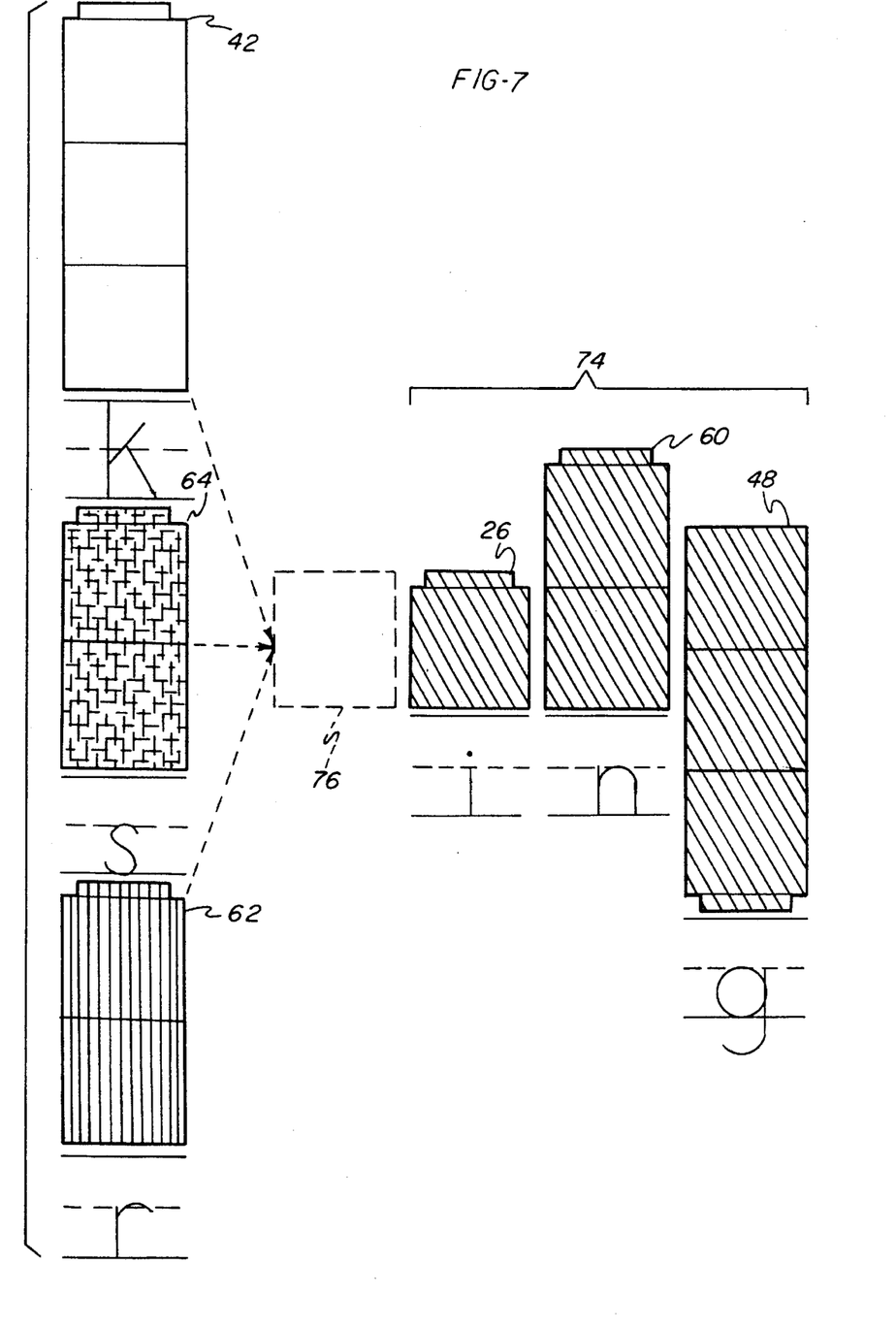
FIG. 7 illustrates the use of the visual indicator members to form the ending sound of a word, and providing different beginning visual indicator members to combine with the ending visual indicator members to form different words.
Figure 8:
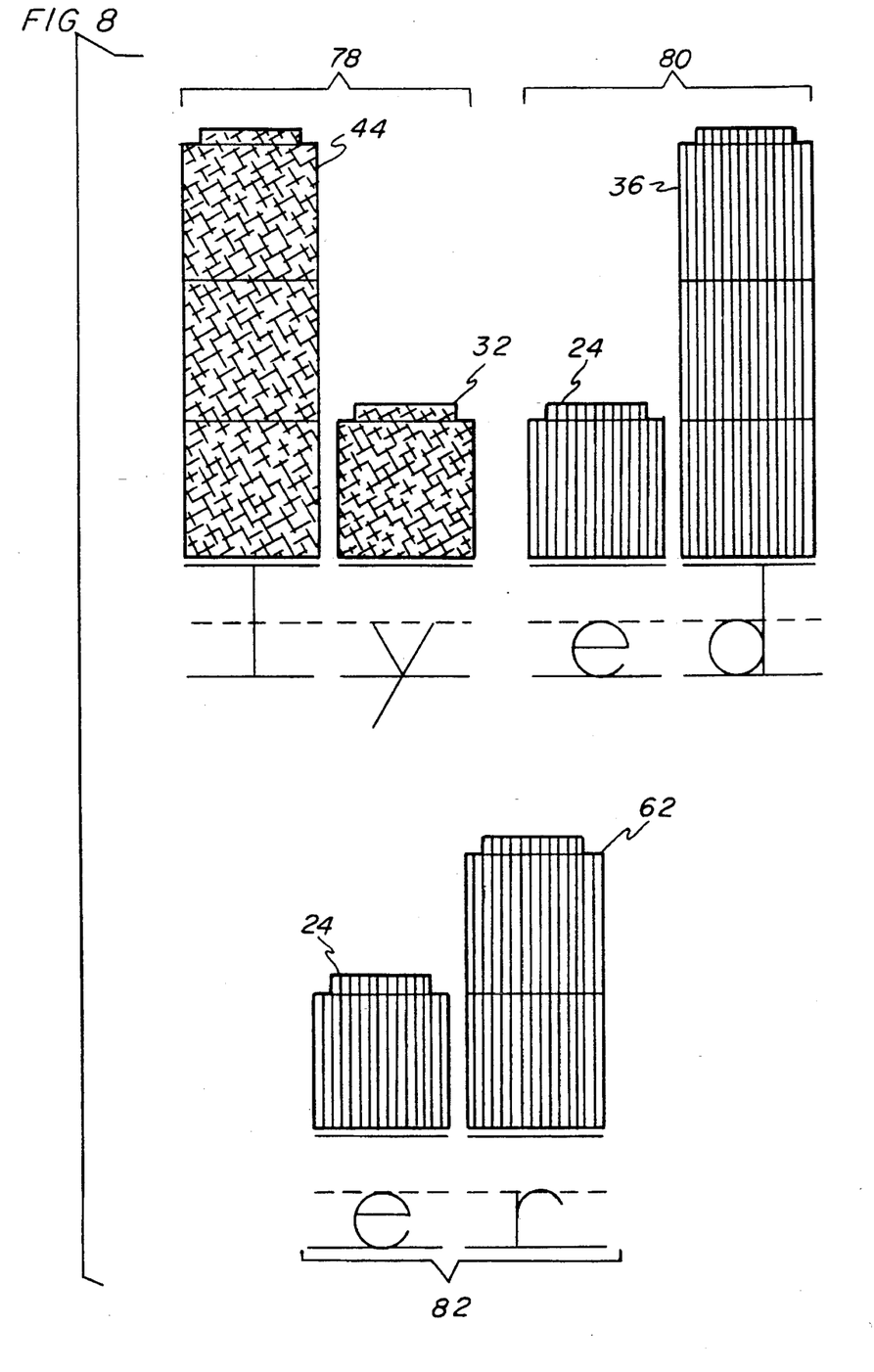
FIG. 8 illustrates three sets of visual indicator members arranged to form word endings.
Figure 9:
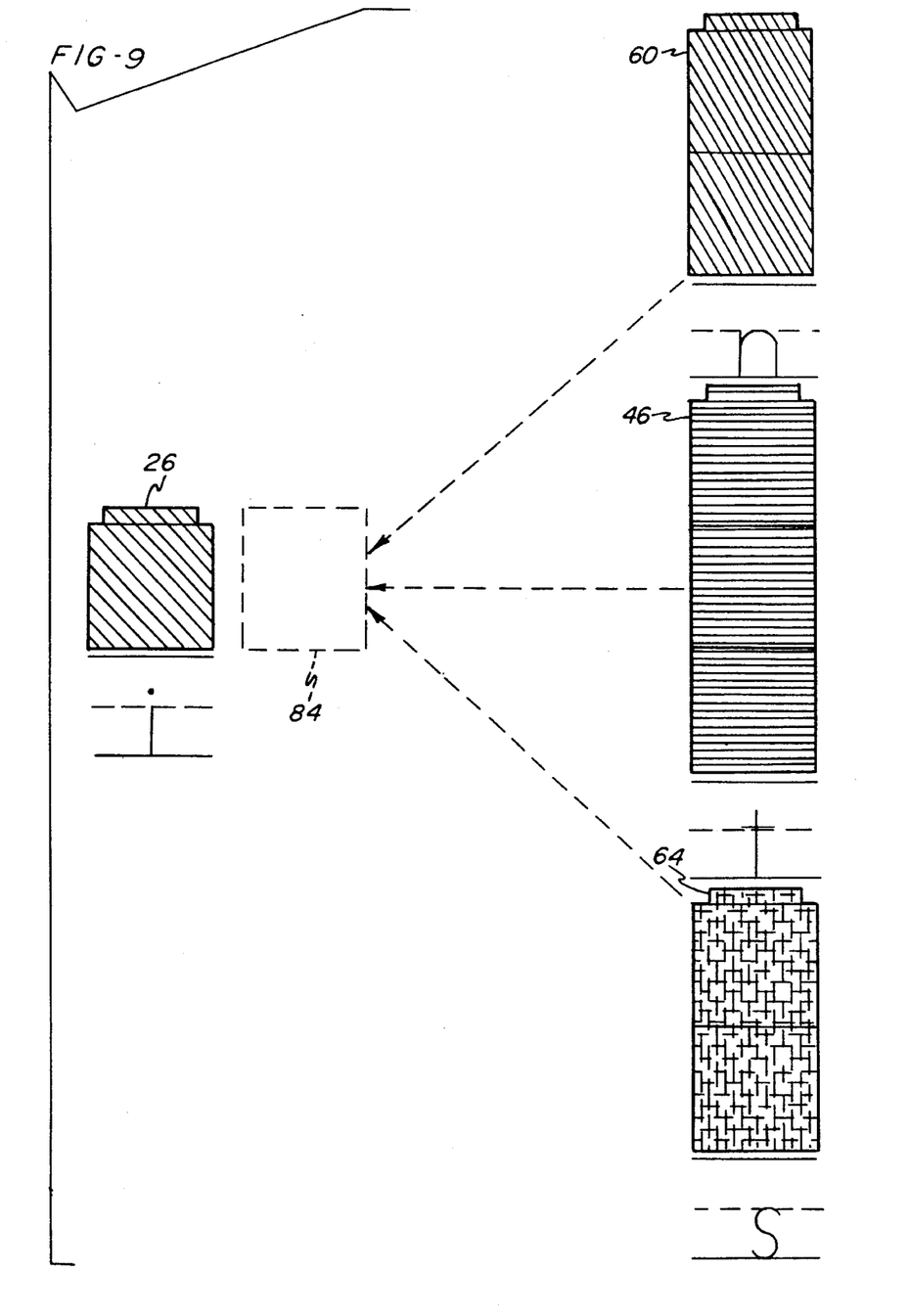
FIG. 9 illustrates the use of a visual indicator member to form the beginning sound of a word, and providing different ending visual indicator members to combine with the first visual indicator member to form different words.

FIGS. 7-9 illustrate the use of the visual indicator members of the present invention to teach reading and spelling skills. The visual indicator members are selected from the different sets, as required, to spell out different words wherein the visual indicator members are used instead of letters for the words. Referring initially to FIG. 7, the visual indicator members 26, 60 and 48 are placed in side-by-side relationship to each other to represent the letters i, n and g. This grouping of visual indicator members 26, 60, 48 forms a letter pattern 74 and represents the word ending ing. In teaching a child, the child is first introduced to the letter pattern 74 such that the child understands that this grouping of visual indicator members will always make the same sound. Subsequently, visual indicator members representing beginning letters for words that include the ing letter pattern 74 may be positioned in the location represented by dotted box 76. For example, the visual indicator members 42, 64 and 62, representing the letters k, s and r, may be placed in association with the letter pattern 74 to form the words king, sing and ring, respectively.

Thus, the child may begin understanding the concept of combining symbols to form particular sounds without actually learning a conventional symbolic alphabet, which alphabet uses symbols unfamiliar to the child. In contrast, the present system uses symbols in the forms of shapes and colors with which the child will already have a certain degree of familiarity. Further, it should be noted that letters from different sets of the visual indicator members forming commonly used letter patterns may be identified with the same color. For example, in the letter pattern 74 illustrated in FIG. 7, the visual indicator member 26 representing the letter i from the first set, visual indicator member 60 representing the letter n from the fourth set and visual indicator member 48 representing the letter g from the third set may all be colored green. By providing a similar color for the letters forming some of the common letter patterns, the child is encouraged to recognize that certain letters are often found together in a grouping which may repeat itself in different words. It should also be noted that the visual indicator member 48 representing the letter g is positioned such that it extends below the bottom of the other two visual indicator members 26 and 60. This arrangement of the visual indicator members better represents the appearance of the actual letters of the alphabet relative to each other in the letter pattern 74 and thereby facilitates the transition when the child is taught the actual letters that the visual indicator members represent.

Referring to FIG. 8, additional word sounds or letter patterns representing word endings are illustrated. In particular, the letter pattern 78 is formed by the visual indicator members 44 and 32 representing the word ending ly; the letter pattern 80 is formed by the visual indicator members 24 and 36 representing the word ending ed; and the letter pattern 82 is formed by the visual indicator members 24 and 62 representing the word ending er. It should be noted that these letter patterns 78, 82 are formed using visual indicator members having the same color to facilitate repetitive reinforcement wherein the word endings represented by these letter patterns are found attached to different words.

FIG. 9 illustrates yet another use of the visual indicator members wherein a word beginning or beginning sound is provided by the visual indicator member 26 representing the letter i. To teach a child the concept of recognizing the short i sound in different words, different visual indicator members may be positioned in the location of dotted box 84 to form different words. For example, the visual indicator members 60, 46 and 64 may be positioned in association with the visual indicator member 26 to form the words in, it and is, respectively.

It should be noted that the present system for teaching reading and spelling skills has several advantages over systems relying on the letters of the alphabet or other abstract symbols for teaching these skills. The present system groups sets of letters together, represented by visual indicator members having a common physical characteristic whereby the child begins to sense a similarity between certain letters. In particular, the child can begin to sense the similarity between the operation of the visual indicator members representing the vowels of the first set, while recognizing a sameness found in the dimensional characteristics of the visual indicator members of this set. Further, the present system uses a simple distinguishing characteristic, i.e., color, for distinguishing between the different letters represented in each set. It should further be noted that in using this system, ten colors or less are preferably used to distinguish between visual indicator members in order to keep the number of factors or variables that must be learned to a minimum.

Another advantage associated with the present system comprises the ability to manipulate the visual indicator members thereby providing the child with not only a visual but also a tactile experience. By providing both a visual and tactile experience, the child's ability to retain the skills taught by the present system is reinforced. For example, the visual indicator member 10 representing the letter a may be placed in a child's hand, and the child then asked to pronounce the sound represented by this cube. This procedure may be repeated with each of the vowel sounds, as well as with consonant sounds to enhance the retention of the memorized sounds associated with each letter.

The visual indicator members may also be modified to further enhance manipulative activity by the child. For example, arms and legs formed of paper or pipe cleaner may be attached to the sides of the visual indicator members such that the visual indicator members resemble people of different sizes. Another example of a modification comprises providing a finger indentation on each of the blocks whereby a child may identify the height of the visual indicator member with reference to the number of indentations for receiving their fingers. These modifications or other modifications to the visual indicator members may enhance the child's attention as he or she goes through the learning process provided by the present system.

As the child becomes familiar with the sounds represented by the different visual indicator members, and how the visual indicator members interrelate to each other to form words, letters may be taped or written onto the individual visual indicator members such that the child gains a familiarity with the particular letter that the visual indicator member represents.

It should also be noted that the present system is not limited to use with visual indicator members formed of the above-described cubes. Other means for forming the visual indicator members may be used. For example, the visual indicator members may be formed by use of tiles, cards or other means.

As should be apparent from the above description, the present system provides an apparatus and method for introducing a child to the concept of using symbols to represent sounds used in language. Further, the symbols used by the present system are greatly simplified and build on basic cognitive skills already acquired by the child. Thus, the present system for teaching reading and spelling is capable of introducing a child to the basic underlying principals involved in reading and spelling without requiring the memorization of the numerous letters of the alphabet.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A kit for teaching reading skills comprising:

a first set of six visual indicator members representing vowel letters wherein said visual indicator members of said first set all have a common height dimension;

a second set of seven visual indicator members representing consonant letters extending above a middle line on ruled penmanship paper wherein said visual indicator members of said second set all have a common height dimension;

a third set of four, visual indicator members representing consonant letters extending below a lower line on ruled penmanship paper wherein said visual indicator members of said third set all have a common height dimension;

a fourth set of nine visual indicator members representing consonant letters not represented by said second and third sets of visual indicator members wherein said visual indicator members of said fourth set all have a common height dimension; and wherein said height dimension of said visual indicator members of said first set is different from said height dimension of said visual indicator members of said second, third and fourth sets, said height dimension of said visual indicator members of said second set is different from said height dimension of said visual indicator members of said fourth set, and said height dimension of said visual indicator members of said third set is different from said height dimension of said visual indicator members of said fourth set.

2. The kit as recited in claim 1 wherein each of the members of each set has a distinguishing member characteristic for distinguishing members within each of said sets from each other.

3. The kit as recited in claim 2 wherein the visual indicator members each have a visually discernable indicia on a surface thereof and said member characteristic comprises a unique indicia for each member of a set.

4. The kit as recited in claim 3 wherein said indicia comprises a unique color characteristic for each member of a set.

5. The kit as recited in claim 1 wherein said first set of visual indicator members represent the letters a, e, i, o, u, and y, said second set of visual indicator members represent the letters b, d, f, h, k, l, and t, said third set of visual indicator members represent the letters g, j, p, and q, and said fourth set of visual indicator members represent the letters c, m, n, r, s, v, w, x, and z.

6. The kit as recited in claim 1 wherein said visual indicator members comprise one or more blocks, and each of said one or more blocks includes means for interconnecting said one or more blocks to another block.

7. A method for teaching reading skills using a plurality of colored visual indicator members for representing letters, said visual indicator members grouped into sets according to a physical characteristic of letters the visual indicator members represent, and each visual indicator member of each said set having a unique color characteristic for distinguishing it from other visual indicator members of the same set, the method comprising the steps of:

providing a first set of six visual indicator members representing vowel letters wherein said visual indicator members of said first set all have a common height dimension;

providing a second set of seven visual indicator members representing consonant letters extending above a middle line on ruled penmanship paper wherein said visual indicator members of said second set all have a common height dimension different from said height dimension of said visual indicator members of said first set;

providing a third set of four visual indicator members representing consonant letters extending below a lower line on ruled penmanship paper wherein said visual indicator members of said third set all have a common height dimension different from said height dimension of said visual indicator members of said first set;

providing a fourth set of nine visual indicator members representing consonant letters not represented by said second and third sets of visual indicator members wherein said visual indicator members of said fourth set all have a common height dimension different from said height dimension of said visual indicator members of said first, second and third sets;

selecting said visual indicator members from said sets and arranging the selected visual indicator members to form a word sound; and identifying the word sound formed by the visual indicator members.

8. The method as recited in claim 7 wherein said step of identifying the word sound formed by the visual indicator members comprises orally pronouncing the word sound.

9. The method as recited in claim 7 wherein the word sound comprises a word ending, the method further including the step of placing different visual indicator members next to the selected visual indicator members to form different words using the same word ending.

10. The method as recited in claim 7 including the step of identifying the letter represented by a visual indicator member by referring to a height dimension of said visual indicator member.

11. The method as recited in claim 10 wherein said step of identifying the letter represented by a visual indicator member further comprises referring to the color of the visual indicator member.

12. The method as recited in claim 7 wherein the word sound comprises a beginning sound for a word, the method further including the step of placing different visual indicator members next to the selected visual indicator members to form different words using the same beginning sound.

* * * * *